(12) United States Patent
Fukumitsu et al.

(10) Patent No.: US 11,424,660 B2
(45) Date of Patent: Aug. 23, 2022

(54) MOTOR-DRIVEN COMPRESSOR

(71) Applicant: KABUSHIKI KAISHA TOYOTA JIDOSHOKKI, Kariya (JP)

(72) Inventors: Kohei Fukumitsu, Kariya (JP); Suehiro Fukazawa, Kariya (JP); Takayuki Ota, Kariya (JP); Kazuya Matsumoto, Kariya (JP); Takahiro Suzuki, Kariya (JP); Atsushi Nishizawa, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 161 days.

(21) Appl. No.: 16/666,875

(22) Filed: Oct. 29, 2019

(65) Prior Publication Data
US 2020/0136463 A1 Apr. 30, 2020

(30) Foreign Application Priority Data
Oct. 31, 2018 (JP) .............................. JP2018-205907

(51) Int. Cl.
*H02K 5/24* (2006.01)
*H02K 11/33* (2016.01)
*F04D 25/06* (2006.01)

(52) U.S. Cl.
CPC ........... *H02K 5/24* (2013.01); *F04D 25/0606* (2013.01); *H02K 11/33* (2016.01)

(58) Field of Classification Search
CPC ...... H02K 5/24; H02K 11/33; F04D 25/0606; F04C 23/008; F04C 2240/30;
(Continued)

(56) References Cited

U.S. PATENT DOCUMENTS 10,119,542 B2 * 11/2018 Kang ...................... F04C 29/06
2012/0237376 A1 * 9/2012 Kinoshita ............. F04B 39/121
417/423.7

(Continued)

FOREIGN PATENT DOCUMENTS

JP  2013-177826 A  9/2013
JP  2016-151246 A  8/2016
(Continued)

OTHER PUBLICATIONS

English translation of Lee et al (WO 2016167409 A1), printed on Sep. 29, 2021.*

(Continued)

*Primary Examiner* — John K Kim
(74) *Attorney, Agent, or Firm* — Sughrue Mion, PLLC

(57) ABSTRACT

A motor-driven compressor includes a compression mechanism, an electric motor, an inverter, a housing, and a cover defining an accommodation chamber with the housing to accommodate the inverter. The cover includes a plate-shaped body wall and insertion holes extending through a periphery of the body wall. The body wall includes a first surface opposed to the inverter in the accommodation chamber, a second surface, a first thickness portion having a first thickness, and a second thickness portion located around at least one of the insertion holes. The second thickness portion has a second thickness that is smaller than the first thickness and is obtained by recessing the body wall from the first surface toward the second surface.

3 Claims, 5 Drawing Sheets

(58) Field of Classification Search
CPC .......... F04C 2240/805; F04C 2240/808; F04C 29/00; F04B 39/121
USPC ........................................ 310/68 D, 89, 68 R
See application file for complete search history.

(56) References Cited

U.S. PATENT DOCUMENTS

| | | | |
|---|---|---|---|
| 2015/0054365 A1* | 2/2015 | Kinoshita | H02K 11/33 |
| | | | 310/71 |
| 2016/0190894 A1* | 6/2016 | Takabe | F04C 23/008 |
| | | | 417/410.5 |
| 2017/0167480 A1* | 6/2017 | Kim | F04C 29/047 |
| 2018/0023568 A1* | 1/2018 | Kang | F01C 21/10 |
| | | | 361/689 |
| 2020/0136463 A1* | 4/2020 | Fukumitsu | H02K 11/33 |
| 2020/0313495 A1* | 10/2020 | Yamakage | H02K 5/10 |

FOREIGN PATENT DOCUMENTS

| | | |
|---|---|---|
| JP | 2017-515041 A | 6/2017 |
| KR | 10-2013-0025649 A | 3/2013 |

OTHER PUBLICATIONS

Communication dated Mar. 30, 2020 from the European Patent Office in application No. 19203505.3.

* cited by examiner

MOTOR-DRIVEN COMPRESSOR

BACKGROUND

1. Field

The following description relates to a motor-driven compressor.

2. Description of Related Art

Japanese Laid-Open Patent Publication No. 2013-177826 discloses a motor-driven compressor. The motor-driven compressor includes a compression mechanism, an electric motor, an inverter, a housing, and a cover. The compression mechanism compresses refrigerant. The electric motor drives the compression mechanism. The inverter controls the driving of the electric motor. The housing accommodates the compression mechanism and the electric motor. The cover is fastened to the housing by fasteners to define an accommodation chamber with the housing to accommodate the inverter.

The cover is made of aluminum alloy and includes a plate-shaped body wall. The body wall includes a first surface opposed to the inverter in the accommodation chamber and a second surface located on the side opposite from the first surface. The body wall includes insertion holes extending through the periphery of the body wall. Each fastener is inserted through the corresponding insertion hole. The body wall includes ribs protruding from the first surface toward the inverter.

During operation of such type of electric motor, when vibration generated by the compression mechanism and the electric motor is transmitted to the housing, the housing vibrates. When the vibration is transmitted from the housing to the cover, the cover vibrates, thereby increasing noise. In the motor-driven compressor of the above-described document, the rigidity of the body wall is increased by the ribs. This limits situations in which the vibration of the housing is transmitted to the cover during the operation of the motor-driven compressor.

However, in the motor-driven compressor of the above-described document, the ribs protrude from the first surface toward the inverter. This reduces the size of the accommodation chamber. As a result, the inverter and the ribs easily interfere with each other in the accommodation chamber. If the accommodation chamber is increased in size in order to solve this problem, the cover is enlarged in the axial direction. This enlarges the motor-driven compressor and increases the weight of the motor-driven compressor.

In order to prevent the interference with the inverter and the ribs while avoiding the enlargement of the accommodation chamber, the ribs may be protruded from the second surface. Nevertheless, the second surface is located outside the motor-driven compressor. This facilitates deposition of foreign matter such as dust or salt in the ribs protruding from the second surface. Thus, the cover easily corrodes, thereby decreasing the durability. In addition, the protrusion of the ribs from the second surface enlarges the cover and consequently enlarges the motor-driven compressor in the axial direction.

SUMMARY

It is an objective of the present disclosure to provide a motor-driven compressor that limits noise during operation and is reduced in size and weight.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A motor-driven compressor according to one aspect of the present disclosure includes a compression mechanism configured to compress fluid, an electric motor configured to drive the compression mechanism, an inverter configured to control driving of the electric motor, a housing that accommodates the compression mechanism and the electric motor, and a cover fastened to the housing by fasteners, the cover defining an accommodation chamber with the housing to accommodate the inverter. The cover includes a plate-shaped body wall and insertion holes extending through a periphery of the body wall, the fasteners being inserted through the insertion holes. The body wall includes a first surface opposed to the inverter in the accommodation chamber, a second surface located at a side opposite from the first surface, a first thickness portion having a first thickness, and a second thickness portion located around at least one of the insertion holes. The second thickness portion has a second thickness that is smaller than the first thickness and is obtained by recessing the body wall from the first surface toward the second surface.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A motor-driven compressor according to an embodiment will now be described with reference to the drawings. This compressor is installed in a vehicle and configures a refrigeration circuit of a vehicle air conditioner.

Figure 1:
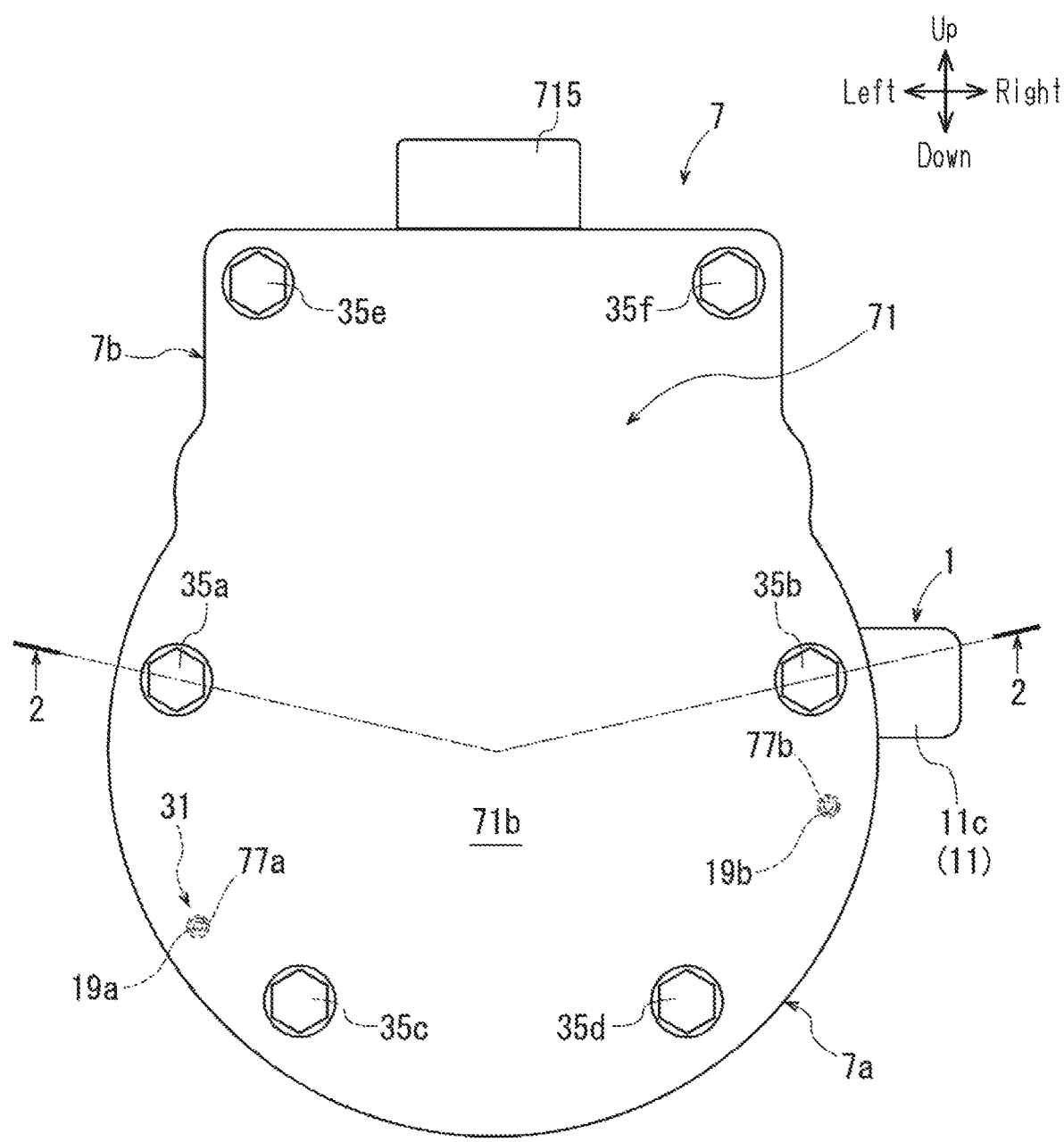
FIG. 1 is a rear view showing a motor-driven compressor according to an embodiment.
Figure 2:
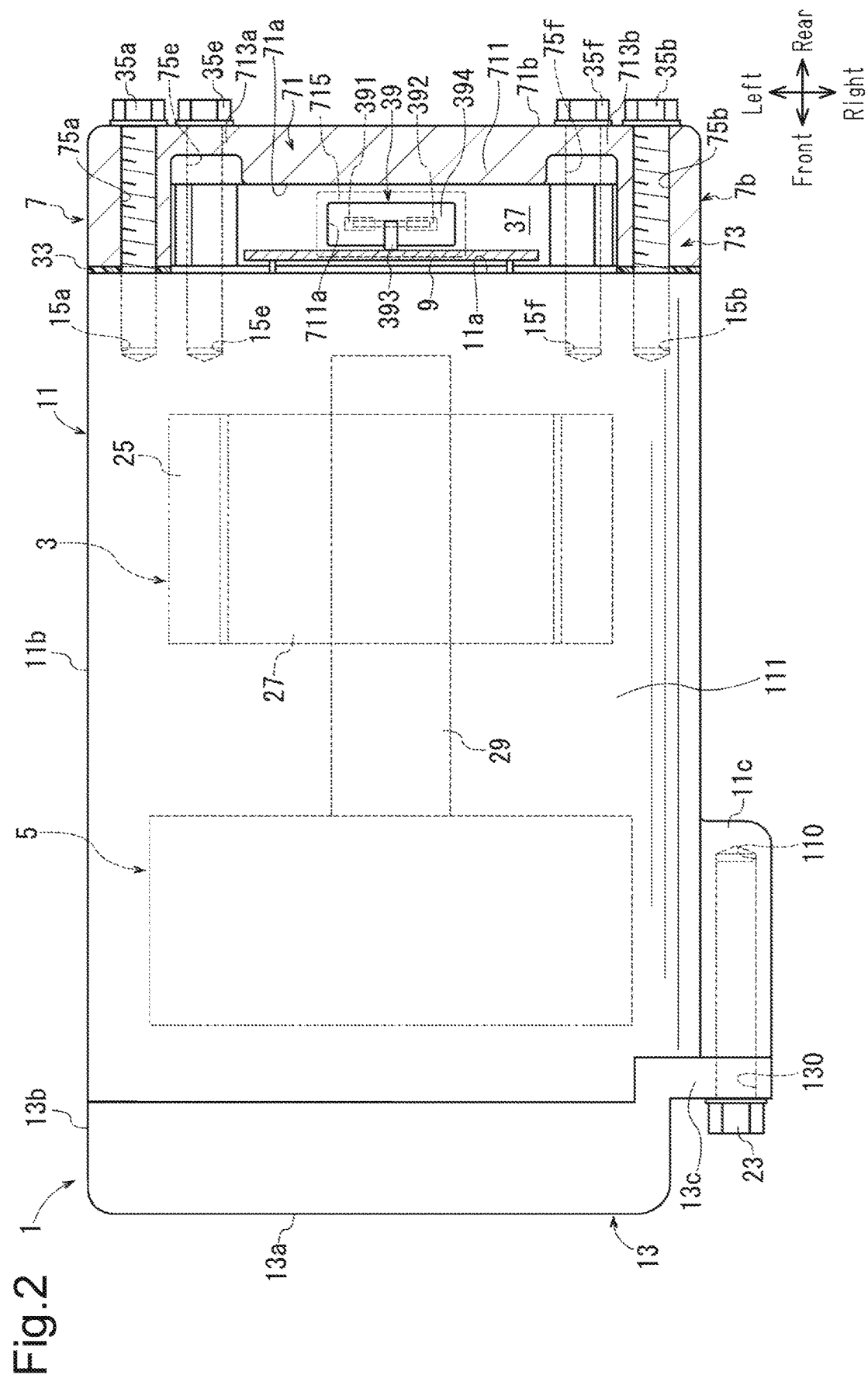
FIG. 2 is a partial cross-sectional view taken along line 2-2 in FIG. 1.

As shown in FIGS. 1 and 2, the motor-driven compressor of the present embodiment includes a housing 1, a motor-driven compressor 3, a compression mechanism 5, a cover 7, an inverter 9, and a positioner 31. The housing 1 includes a first housing member 11 and a second housing member 13.

In the present embodiment, the upper, lower, left, and right directions of the motor-driven compressor are defined using coordinate axes shown in FIG. 1. In FIGS. 2 to 5, the upper, lower, left, and right directions are defined using coordinate axes corresponding to FIG. 1. In FIGS. 2 and 5, the front-rear direction of the motor-driven compressor is defined such that the side where the second housing member 13 is located relative to the first housing member 11 is set as the front and the side where the cover 7 is located relative to the first housing member 11 is set as the rear. These directions are merely examples to aid explanation. The position of the motor-driven compressor is changed in correspondence with the vehicle or the like in which the motor-driven compressor is installed.

Referring to FIG. 2, the first housing member 11 is made of aluminum alloy. The first housing member 11 includes a first end wall 11a (first bottom wall), a first circumferential wall 11b (first side wall), and a first flange 11c. The first end wall 11a is the rear end of the first housing member 11 and extends in the radial direction of the motor-driven compressor. The first circumferential wall 11b is continuous with the first end wall 11a and extends frontward from the first end wall 11a along the axis of the motor-driven compressor. The first end wall 11a is an end wall that closes the rear end of the first circumferential wall 11b, and the front end of the first circumferential wall 11b opens. The first housing member 11 is hollow and opens frontward. The first flange 11c is formed integrally with the first circumferential wall 11b and protrudes from the first circumferential wall 11b toward the right side of the motor-driven compressor. The first flange 11c includes a first insertion hole 110.

Figure 3:
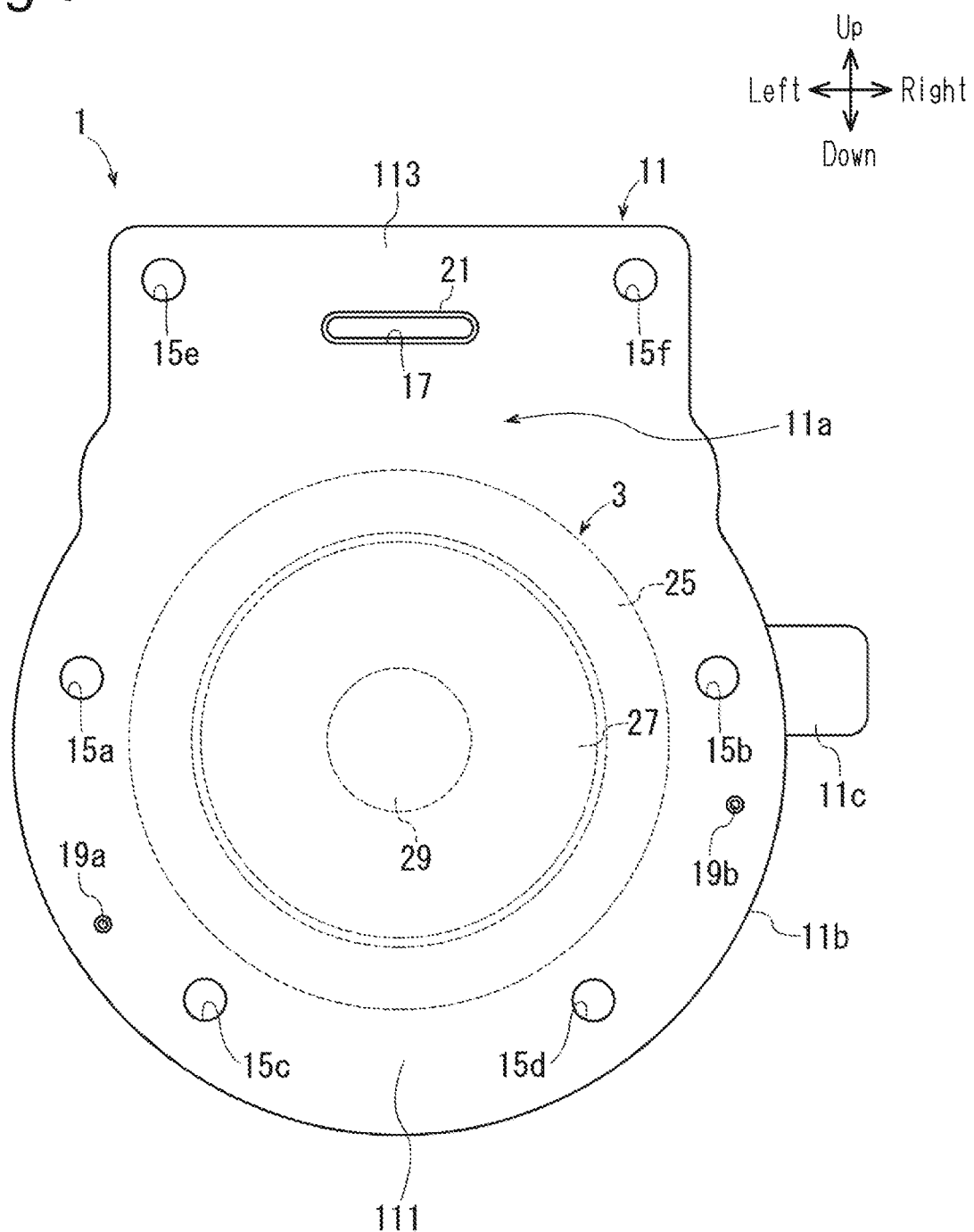
FIG. 3 is a rear view showing the housing of the motor-driven compressor of FIG. 1.

As shown in FIG. 3, the first housing member 11 includes a motor accommodation portion 111 and a bridge 113. The motor accommodation portion 111 is a lower portion of the first housing member 11. The motor accommodation portion 111 is substantially tubular. The motor accommodation portion 111 has an inlet (not shown), which opens in the first circumferential wall 11b. The bridge 113 is continuous with the motor accommodation portion 111 and located on the upper side of the motor accommodation portion 111. The bridge 113 is an upper portion of the first housing member 11. The bridge 113 has the form of a substantially rectangular box. The shapes of the motor accommodation portion 111 and the bridge 113 can be changed.

The first housing member 11 includes first to sixth housing-side insertion holes 15a to 15f and a connection port 17. The first housing member 11 includes first and second fitting pins 19a and 19b (positioning pins). The first and second fitting pins 19a and 19b are examples of fitting portions.

As shown in FIG. 3, each of the first to sixth housing-side insertion holes 15a to 15f extends in the axial direction of the first housing member 11, that is, in the front-rear direction of the motor-driven compressor, in the first end wall 11a and the first circumferential wall 11b. Each of the first to sixth housing-side insertion holes 15a to 15f opens in the first end wall 11a. As shown in FIG. 3, the first to fourth housing-side insertion holes 15a to 15d are located at the lower portion of the first housing member 11, that is, located at the motor accommodation portion 111. The first to fourth housing-side insertion holes 15a to 15d are laid out in the circumferential direction of the motor accommodation portion 111 to surround the electric motor 3. The fifth and sixth housing-side insertion holes 15e and 15f are located at the bridge 113, which is the upper portion of the first housing member 11. The fifth housing-side insertion hole 15e is located on the left end of the bridge 113, and the sixth housing-side insertion hole 15f is located on the right end of the bridge 113.

The connection port 17 is located between the fifth housing-side insertion hole 15e and the sixth housing-side insertion hole 15f in the first end wall 11a. The inside of the bridge 113 is connected to the motor accommodation portion 111 through the connection port 17. A sealing member 21 is arranged in the connection port 17.

The first and second fitting pins 19a and 19b are partially embedded in the first end wall 11a and fitted to the first end wall 11a. The first and second fitting pins 19a and 19b extend rearward from the first end wall 11a. That is, the first and second fitting pins 19a and 19b extend from the first end wall 11a toward a circumferential wall 73 of the cover 7 along the axis of the first housing member 11. The circumferential wall 73 will be described later.

The first and second fitting pins 19a and 19b are located at the motor accommodation portion 111, which is the lower portion of the first housing member 11. More specifically, the first fitting pin 19a is located proximate to the left end of the motor accommodation portion 111 and between the first housing-side insertion hole 15a and the third housing-side insertion hole 15c. The second fitting pin 19b is located proximate to the right end of the motor accommodation portion 111 and between the second housing-side insertion hole 15b and the fourth housing-side insertion hole 15d. The second fitting pin 19b is located slightly above the first fitting pin 19a in the motor accommodation portion 111.

Referring to FIG. 2, the second housing member 13 is made of aluminum alloy. The second housing member 13 includes a second end wall 13a (second bottom wall), a second circumferential wall 13b (second side wall), and a second flange 13c. The second end wall 13a is located at the front end of the second housing member 13 and extends in the radial direction of the motor-driven compressor. The second circumferential wall 13b extends rearward from the second end wall 13a along the axis of the motor-driven compressor. The second housing member 13, which includes the second end wall 13a and the second circumferential wall 13b, has a tubular shape and opens rearward. Although not illustrated in detail in the drawings, the second housing member 13 has a shape corresponding to the shape of the first housing member 11. That is, the second housing member 13 has a substantially tubular lower portion and a substantially box-shaped upper portion. The second flange 13c protrudes rightward from the second circumferential wall 13b. The second flange 13c includes a second insertion hole 130.

The second housing member 13 is located in front of the first housing member 11 with the second flange 13c aligned to the first flange 11c of the first housing member 11. The first housing member 11 and the second housing member 13 are fastened to each other by bolts (not shown) in addition to a bolt 23, which is inserted through the first and second insertion holes 110 and 130. Thus, the first housing member 11 and the second housing member 13 are integrated with each other. The first and second housing members 11 and 13 do not have to be made of aluminum alloy.

The motor-driven compressor 3 is accommodated in the motor accommodation portion 111 of the first housing member 11. The motor-driven compressor 3 includes a stator 25, a rotor 27, a drive shaft 29, and a connection portion (not shown). The stator 25 is fixed to the inner circumferential surface of the first circumferential wall 11b in the motor accommodation portion 111. The stator 25 includes coils (not shown). The rotor 27 is arranged on the inner circumferential side of the stator 25. The drive shaft 29 is fixed to the rotor 27 such that the drive shaft 29 rotates integrally with the rotor 27. The connection portion is connected to a cluster block (not shown), which is accommodated in the bridge 113. The cluster block is connected to a connection terminal (not shown) in the bridge 113.

The compression mechanism 5 is located in front of the electric motor 3 in the motor accommodation portion 111. The compression mechanism 5 is a typical scroll compression mechanism. The compression mechanism 5 includes a fixed scroll, which is fixed to the inner circumferential surface of the first circumferential wall 11b, and a movable scroll, which is opposed to the fixed scroll. The movable scroll is connected to the drive shaft 29 such that power can be transmitted from the movable scroll to the drive shaft 29. The movable scroll is rotated by the drive shaft 29. The fixed scroll meshes with the movable scroll. A compression chamber is defined between the fixed scroll and the movable scroll. A discharge chamber is defined between the fixed scroll and the second housing member 13. The fixed scroll, the movable scroll, the compression chamber, and the discharge chamber are not illustrated in the drawings. The compression mechanism 5 may be a vane-type compression mechanism.

Figure 4:
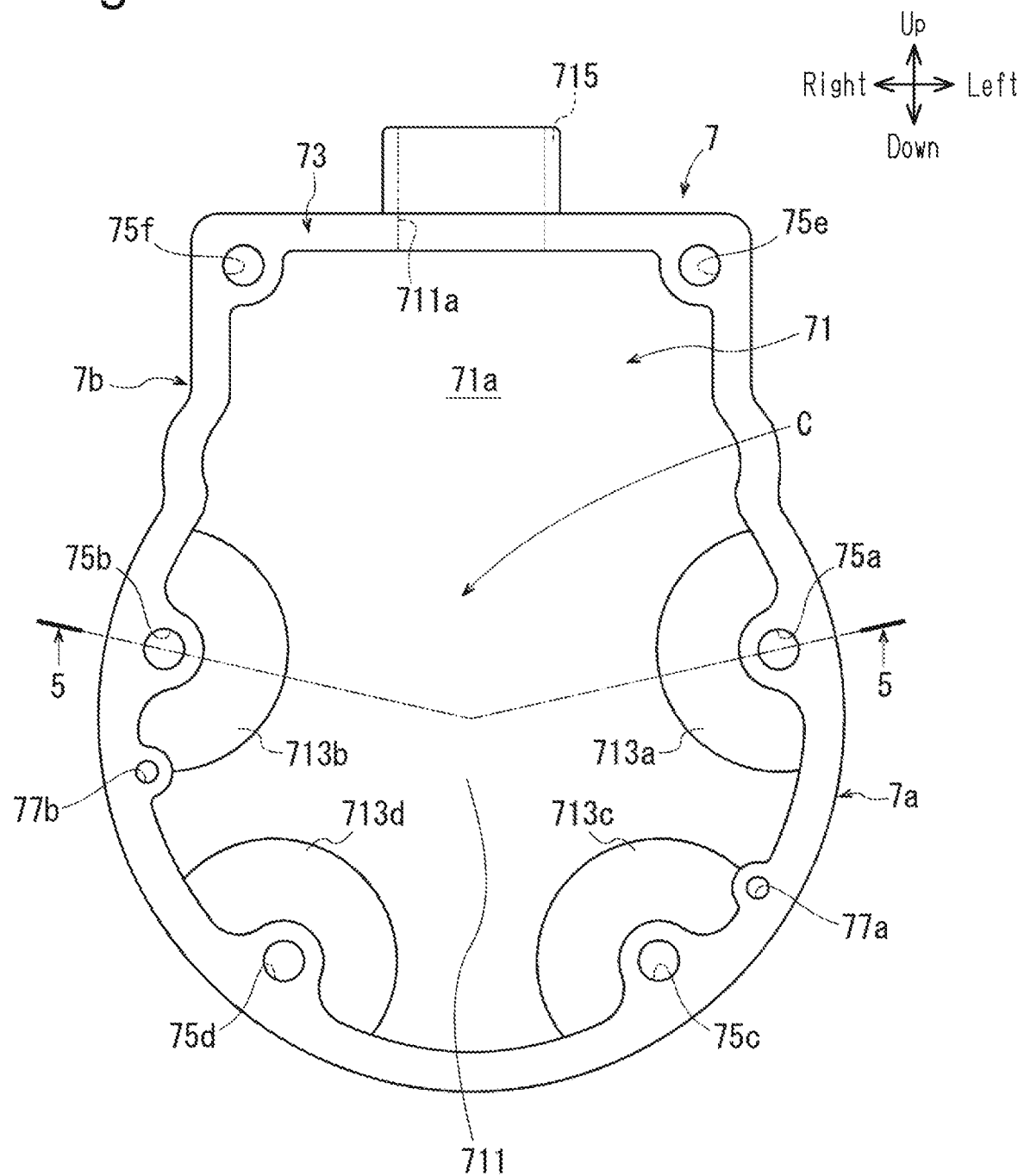
FIG. 4 is a front view showing the cover of the motor-driven compressor of FIG. 1.
Figure 5:
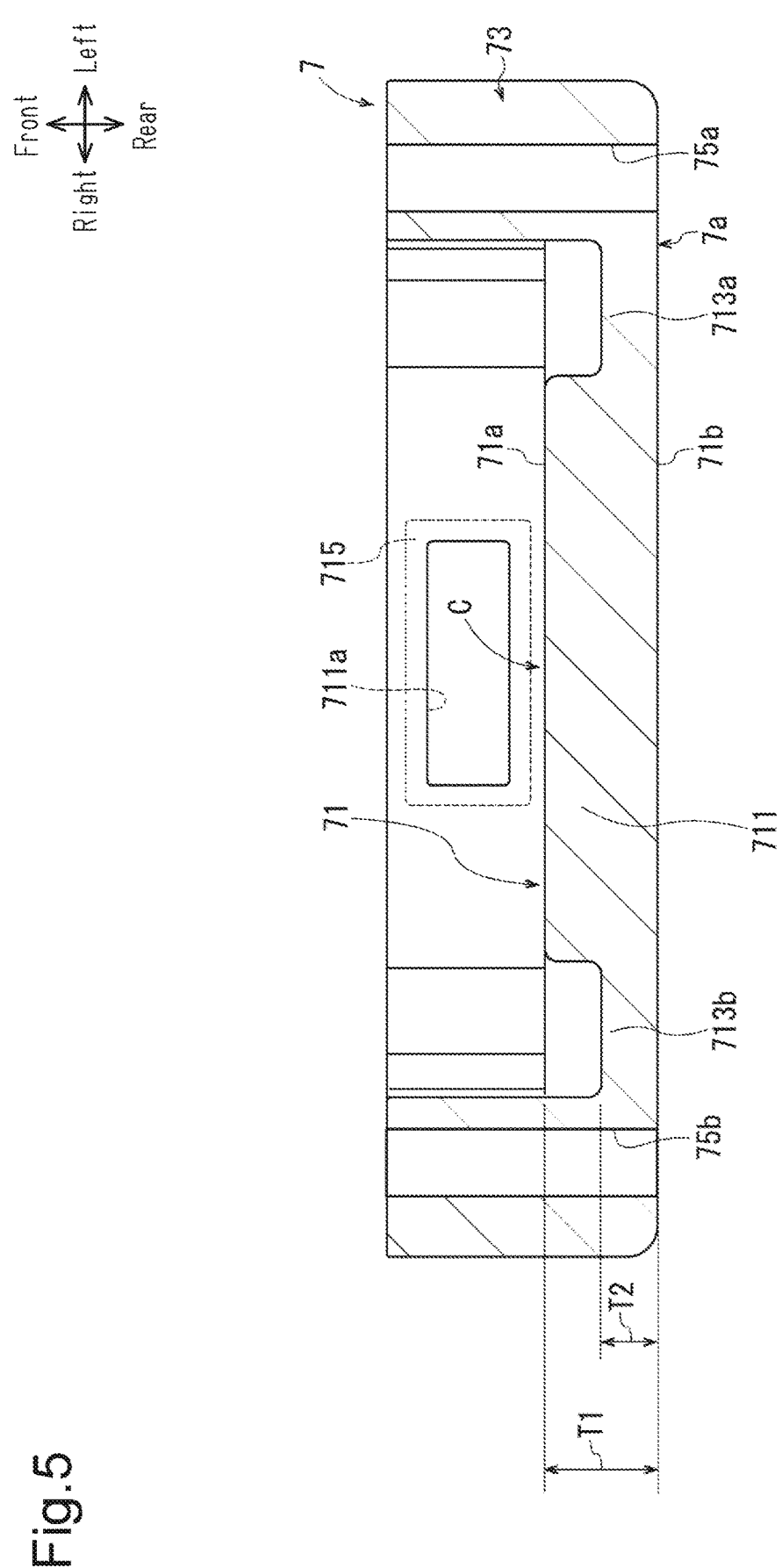
FIG. 5 is an enlarged view of the cross section taken along line 5-5 in FIG. 4.

Referring to FIGS. 4 and 5, the cover 7 is made of, for example, aluminum alloy. The cover 7 includes a body wall 71, the circumferential wall 73, and first to sixth cover-side insertion holes 75a to 75f. The first to sixth cover-side insertion holes 75a to 75f are examples of insertion holes. The cover 7 may be made of plastic.

As shown in FIG. 5, the body wall 71 is the rear end of the cover 7 and extends in the radial direction of the motor-driven compressor. The body wall 71 is plate-shaped and includes a first surface 71a and a second surface 71b. The first surface 71a is a front surface. The second surface 71b is a rear surface located on the side opposite from the first surface 71a and oriented toward the outside of the motor-driven compressor. The detail of the body wall 71 will be described later.

As shown in FIG. 4, the circumferential wall 73 is integrated with the body wall 71 along the entire outer edge of the first surface 71a. As shown in FIG. 2, the circumferential wall 73 extends frontward from the body wall 71 toward the first housing member 11 along the axis of the cover 7. The cover 7, which includes the body wall 71 and the circumferential wall 73, has a substantially tubular shape and opens frontward. The cover 7 is shaped in correspondence with the first housing member 11. That is, the cover 7 includes a substantially tubular first part 7a, which corresponds to the motor accommodation portion 111, and a substantially tubular second part 7b, which corresponds to the bridge 113. The shape of the cover 7 can be changed in accordance with the shapes of the first housing member 11, the inverter 9, and the like.

The circumferential wall 73 has a through hole 711a. The through hole 711a extends through the circumferential wall 73 in the vertical direction, and an accommodation chamber 37 (described later) is connected to the exterior of the cover 7 through the through hole 711a. The circumferential wall 73 is integrated with a connector 715. The connector 715 is substantially box-shaped to surround the through hole 711a and protrudes upward from the circumferential wall 73. The through hole 711a and the connector 715 may be included in the body wall 71.

The body wall 71 and the circumferential wall 73 include the first to sixth cover-side insertion holes 75a to 75f. More specifically, the first to sixth cover-side insertion holes 75a to 75f are arranged along the periphery of the body wall 71 and extended through the body wall 71 and the circumferential wall 73 in the axial direction of the cover 7. The first to sixth cover-side insertion holes 75a to 75f are respectively located at positions corresponding to the first to sixth housing-side insertion holes 15a to 15f, which are shown in FIG. 3. That is, as shown in FIG. 4, the first to fourth cover-side insertion holes 75a to 75d are located at the first part 7a and laid out in the circumferential direction of the first part 7a. The first to fourth cover-side insertion holes 75a to 75d are specific insertion holes. The fifth and sixth cover-side insertion holes 75e and 75f are arranged at the second part 7b of the cover 7. The fifth cover-side insertion hole 75e is located on the left end of the second part 7b, and the sixth cover-side insertion hole 75f is located on the right end of the second part 7b.

The body wall 71 includes a first thickness portion 711 and second thickness portions 713a to 713d. The proportion of the first thickness portion 711 accounting for the body wall 71 is larger than the proportions of the second thickness portions 713a to 713d accounting for the body wall 71. In other words, most of the body wall 71 is the first thickness portion 711. As shown in FIG. 5, the thickness of the first thickness portion 711 is a first thickness T1.

As shown in FIG. 4, the second thickness portion 713a is arranged to surround the first cover-side insertion hole 75a. More specifically, the second thickness portion 713a is substantially sectoral and extends around the first cover-side insertion hole 75a to be concentric with the first cover-side insertion hole 75a, and the opposite ends of the second thickness portion 713a in the circumferential direction connect to the circumferential wall 73. In the same manner, the second thickness portions 713b to 713d are arranged to surround the second to fourth cover-side insertion holes 75b to 75d, respectively. The second thickness portions 713b to 713d are substantially sectoral and extend around the second to fourth cover-side insertion hole 75b to 75d to be concentric with the second to fourth cover-side insertion hole 75b to 75d, and the opposite ends of each of the second thickness portions 713b to 713d in the circumferential direction connect to the circumferential wall 73. The second thickness portions 713a to 713d are arranged to surround the body wall 71 in the first part 7a of the cover 7.

The second thickness portions 713a to 713d define a central portion C in the body wall 71. The central portion C is located at a position of the first thickness portion 711 closer to the center of the body wall 71 than to the second thickness portions 713a to 713d. Since the thickness of the first thickness portion 711 is the first thickness T1, the thickness of the central portion C is the first thickness T1.

As shown in FIG. 5, the body wall 71 includes multiple (for example, four) recesses that are recessed from the first surface 71a toward the second surface 71b. The portions between the inner bottom surfaces of the recesses and the second surface 71b are the second thickness portions 713a to 713d. The second thickness portions 713b to 713d have a second thickness T2, which is smaller than the first thickness T1. The second thickness T2 may be approximately half of the first thickness T1. In the body wall 71, the rigidity of the second thickness portions 713b to 713d, which have a small thickness, is lower than that of the first thickness portion 711. As long as the second thickness T2 is smaller than the first thickness T1, the second thickness T2 can be changed.

As shown in FIG. 4, the circumferential wall 73 of the cover 7 includes first and second fitted recesses 77a and 77b. The first and second fitted recesses 77a and 77b are examples of fitted portions. As shown in FIG. 1, the positioners 31 include the first and second fitting pins 19a and 19b and the first and second fitted portions 77a and 77b, respectively.

As shown in FIG. 4, each of the first and second fitted recesses 77a and 77b opens in the end surface of the circumferential wall 73 and extends toward the rear of the motor-driven compressor along the axis of the cover 7. The first and second fitting pins 19a and 19b can be inserted through the first and second fitted recesses 77a and 77b, respectively. The depth of the first and second fitted recesses 77a and 77b is set such that the first and second fitted recesses 77a and 77b do not extend through the body wall 71.

The first and second fitted recesses 77a and 77b are respectively located at positions corresponding to the first and second fitting pins 19a and 19b. That is, the first fitted recess 77a is arranged between the first cover-side insertion hole 75a and the third cover-side insertion hole 75c in the circumferential wall 73, and the second fitted recess 77b is arranged between the second cover-side insertion hole 75b and the fourth cover-side insertion hole 75d in the circumferential wall 73.

The first fitted recess 77a is adjacent to the second thickness portion 713c, and the second fitted recess 77b is adjacent to the second thickness portion 713b. More specifically, as shown in FIG. 4, the first fitted recess 77a is located at a portion of the circumferential wall 73 to which the left end of the arcuate outer edge of the second thickness portion 713c is connected, and the second fitted recess 77b is located at a portion of the circumferential wall 73 to which the lower end of the arcuate outer edge of the second thickness portion 713b is connected.

As shown in FIG. 2, the cover 7 is located behind the first housing member 11 such that the first surface 71a of the body wall 71 is opposed to the first end wall 11a of the first housing member 11. A gasket 33 may be arranged between the cover 7 and the first housing member 11.

As shown in FIG. 1, the motor-driven compressor of the present embodiment includes the first fitting pin 19a, which is inserted through the first fitted recess 77a, and the second fitting pin 19b, which is inserted through the second fitted recess 77b. The first and second fitting pins 19a and 19b are fitted to the first and second fitted recesses 77a and 77b, respectively. Thus, as shown in FIG. 2, the first housing member 11 and the cover 7 are positioned with the first to sixth housing-side insertion holes 15a to 15f aligned to the first to sixth cover-side insertion holes 75a to 75f, respectively.

With the first housing member 11 positioned relative to the cover 7, the cover 7 is fastened to the first housing member 11 by the first to sixth bolts 35a to 35f, which are shown in FIG. 1. The first to sixth bolts 35a to 35f are examples of fasteners. More specifically, the first bolt 35a is inserted through the first cover-side insertion hole 75a and the first housing-side insertion hole 15a from the second surface 71b of the body wall 71. In the same manner, the second bolt 35b is inserted through the second cover-side insertion hole 75b and the second housing-side insertion hole 15b. The third bolt 35c is inserted through the third cover-side insertion hole 75c and the third housing-side insertion hole 15c. The fourth bolt 35d is inserted through the fourth cover-side insertion hole 75d and the fourth housing-side insertion hole 15d. The fifth bolt 35e is inserted through the fifth cover-side insertion hole 75e and the fifth housing-side insertion hole 15e. The sixth bolt 35f is inserted through the sixth cover-side insertion hole 75f and the sixth housing-side insertion hole 15f. In this manner, the first part 7a of the cover 7 is fastened to the motor accommodation portion 111 of the first housing member 11 by the first to fourth bolts 35a to 35d, and the second part 7b of the cover 7 is fastened to the bridge 113 of the first housing member 11 by the fifth and sixth bolts 35e and 35f. Among the first to sixth bolts 35a to 35f, the first to fourth bolts 35a to 35d are specific fasteners. The number of the first to sixth bolts 35a to 35f can be changed in accordance with the sizes and the like of the first housing member 11 and the cover 7. Consequently, the number of the first to sixth cover-side insertion holes 75a to 75f and the number of the first to sixth housing-side insertion holes 15a to 15f can be changed in accordance with the sizes and the like of the first housing member 11 and the cover 7.

In this manner, when the cover 7 is fastened to the first housing member 11, the accommodation chamber 37 is defined between the first end wall 11a and the first surface 71a as shown in FIG. 2. The accommodation chamber 37, which is surrounded by the circumferential wall 73, is isolated from the outside of the motor-driven compressor except the through hole 711a. The gasket 33 seals a part between the accommodation chamber 37 and the first housing member 11.

The inverter 9 is fixed to the first end wall 11a and accommodated in the accommodation chamber 37. In the accommodation chamber 37, the inverter 9 is opposed to the first surface 71a of the body wall 71. Although not illustrated in detail in the drawings, the inverter 9 includes a circuit board, semiconductor elements, which are arranged on the circuit board, and a lead wire, which is connected to the circuit board. The lead wire extends into the bridge 113 through the connection port 17, which is shown in FIG. 3, and is connected to the connection terminal. This connects the inverter 9 to the electric motor 3.

As shown in FIG. 2, a power supply assembly 39 is arranged in the through hole 711a of the cover 7. The power supply assembly 39 is formed by insert-molding a first terminal 391, a second terminal 392, and a bus bar 393 into an insulating plastic 394. The power supply assembly 39 is connected to the inverter 9 by the bus bar 393 in the accommodation chamber 37.

In the above-described motor-driven compressor, the connector 715 of the cover 7 is connected to a power supply (not shown), which is located outside the motor-driven compressor, by a cable (not shown). This supplies direct-current power from the power supply through the power supply assembly 39 to the inverter 9. The inverter 9 controls the driving of the electric motor 3 by converting the direct-current power into alternating-current power and supplying the electric motor 3 with the alternating-current power. When the electric motor 3 is supplied with the alternating-current power, the rotor 27 and the drive shaft 29 rotate. This drives the compression mechanism 5. The compression mechanism 5 compresses refrigerant gas drawn in from the inlet and discharges the compressed refrigerant gas out of the discharge port. The refrigerant gas is an example of fluid.

The cover 7 of the motor-driven compressor is fastened to the first housing member 11 by the first to sixth bolts 35a to 35f, which are inserted through the first to sixth cover-side insertion holes 75a to 75f. Thus, when the electric motor 3 and the compression mechanism 5 are operating, vibration of the first housing member 11 can be transmitted through the first to sixth bolts 35a to 35f to the cover 7. In particular, the vibration of the first housing member 11 is easily transmitted through the first to sixth bolts 35a to 35f to the surroundings of the first to sixth cover-side insertion holes 75a to 75f. Additionally, since the electric motor 3 is accommodated in the motor accommodation portion 111 of the first housing member 11, the vibration of the first housing member 11 is easily transmitted through the first to fourth bolts 35a to 35d to the surroundings of the first to fourth cover-side insertion holes 75a to 75d in the first part 7a of the cover 7.

The first to sixth cover-side insertion holes 75a to 75f of the motor-driven compressor are arranged on the periphery of the body wall 71. Further, the body wall 71 includes the first thickness portion 711 and the second thickness portions 713a to 713d. The second thickness portions 713a to 713d have the second thickness T2, which is smaller than the first thickness T1 of the first thickness portion 711. The second thickness portions 713a to 713d are arranged around the first to fourth cover-side insertion holes 75a to 75d, respectively. The second thickness portions 713a to 713d, which respectively surround the first to fourth cover-side insertion holes 75a to 75d, partially reduce the rigidity of the body wall 71. That is, the rigidity of the periphery is low in the body wall 71 of the motor-driven compressor. By contrast, the first thickness portion 711 has the first thickness T1, which is larger than the thickness of the second thickness portions 713a to 713d. Thus, the first thickness portion 711 including the central portion C of the body wall 71 has a higher rigidity than the periphery of the body wall 71, except the periphery of the body wall 71. Further, the first thickness portion 711 has a large proportion of the body wall 71, and thus sufficiently increases the rigidity of the body wall 71 and consequently increases the overall rigidity of the cover 7.

When the motor-driven compressor is operating, vibration of the first housing member 11 easily vibrates the second thickness portions 713a to 713d of the cover 7. Thus, the vibration of the first housing member 11 can be easily absorbed by the second thickness portions 713a to 713d including the motor accommodation portion 111, that is, by the surrounding parts of the first to fourth cover-side insertion holes 75a to 75d. This limits the transmission of vibration of the first housing member 11 to the central portion C of the body wall 71 and limits vibration of the central portion C of the body wall 71 when the motor-driven compressor is operating. Noise resulting from the vibration occurs at the central portion C. Accordingly, when the surrounding parts of the first to fourth cover-side insertion holes 75a to 75d are intentionally vibrated by the second thickness portions 713a to 713d and the vibration at the central portion C is limited, noise hardly occurs even if the vibration of the first housing member 11 is transmitted to the cover 7 during operation of the motor-driven compressor.

The second thickness portions 713a to 713d are recessed from the first surface 71a toward the second surface 71b. Thus, the arrangement of the second thickness portions 713a to 713d does not reduce the size of the accommodation chamber 37. This eliminates the need to enlarge the cover 7 in the axial direction in order to obtain a large accommodation chamber 37 in the motor-driven compressor.

When the cover 7 is fastened to the first housing member 11, the second thickness portions 713a to 713d are located in the accommodation chamber 37. This limits deposition of foreign matter such as dust and salt in the second thickness portions 713a to 713d. The second surface 71b, which is exposed to the outside of the motor-driven compressor, is flat. This limits deposition of foreign matter in the second surface 71b and thus limits corrosion of the cover 7 of the motor-driven compressor.

Accordingly, the motor-driven compressor of the present embodiment reduces noise produced during operation of the motor-driven compressor and reduces the motor-driven compressor in size and weight.

Particularly, the second thickness portions 713a to 713d, which are substantially sectoral, connect to the circumferential wall 73 while respectively surrounding the first to fourth cover-side insertion holes 75a to 75d. This limits the transmission of vibration of the first housing member 11 to the central portion C of the body wall 71 while minimizing the proportions of the second thickness portions 713a to 713d accounting for the body wall 71. This thus limits the transmission of vibration of the first housing member 11 to the central portion C of the body wall 71 during operation of the motor-driven compressor while obtaining the rigidity of the cover 7.

The circumferential wall 73 of the cover 7 separates the outside of the motor-driven compressor and the accommodation chamber 37 from each other. Further, as compared to when the first housing member 11 has a circumferential wall extending toward the cover 7, the shape of the first housing member 11 is not complicated. This facilitates shaping of the first housing member 11.

Further, the positioners 31 are used to facilitate positioning of the first housing member 11 and the cover 7, thereby facilitating fastening of the first housing member 11 and the cover 7 to each other. The positioners 31 include the first and second fitting pins 19a and 19b and the first and second fitted recesses 77a and 77b and thus have a simple structure. The first fitted recess 77a is adjacent to the second thickness portion 713c, and the second fitted recess 77b is adjacent to the second thickness portion 713b. Thus, the first and second fitting pins 19a and 19b and the first and second fitted recesses 77a and 77b limit the transmission of vibration of the first housing member 11 to the central portion C of the body wall 71.

The above-described embodiment is intended only for description, not for limitation. The above-described embodiment may be modified within the claims and the scope thereof.

For example, the shape of the second thickness portions 713a to 713d may be changed to a shape other than a substantially sectoral shape. Further, the second thickness portions 713a to 713d may have different shapes.

In addition, the body wall 71 may include second thickness portions located around the fifth and sixth cover-side insertion holes 75e and 75f in addition to the second thickness portions 713a to 713d.

Alternatively, the body wall 71 may include the second thickness portion 713a around only one of the first to sixth cover-side insertion holes 75a to 75f.

Further, in order to prevent the heads of the first to sixth cover-side insertion holes 75a to 75f from protruding toward the rear side of the cover 7, the second surface 71b of the body wall 71 may include recesses that surround the first to sixth cover-side insertion holes 75a to 75f.

Instead of the circumferential wall 73 of the cover 7, the first housing member 11 may include a circumferential wall extending toward the cover 7 while surrounding the first end wall 11a.

The first end wall 11a may include only the first fitting pin 19a or may include an additional fitting pin in addition to the first and second fitting pins 19a and 19b. Further, the first fitting pin 19a may be arranged at the motor accommodation portion 111, and the second fitting pin 19b may be arranged at the bridge 113. Alternatively, the first and second fitting pins 19a and 19b may both be arranged at the bridge 113.

The compression mechanism 5 may compress fluid other than refrigerant gas.

The present disclosure is applicable to the air conditioner for, for example, a vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor-driven compressor comprising:
a compression mechanism configured to compress fluid;
an electric motor configured to drive the compression mechanism;
an inverter configured to control driving of the electric motor;
a housing that accommodates the compression mechanism and the electric motor; and
a cover fastened to the housing by fasteners, the cover defining an accommodation chamber with the housing to accommodate the inverter, wherein
the cover includes
  a plate-shaped body wall, and
  insertion holes extending through a periphery of the body wall, the fasteners being inserted through the insertion holes, and
the body wall includes
  a first surface that faces the inverter in the accommodation chamber,
  a second surface located at a side of the body wall opposite from the first surface,
  a first thickness portion having a first thickness, and
  a second thickness portion located around at least one of the insertion holes, wherein the second thickness portion has a second thickness that is smaller than the first thickness, and the second thickness portion is recessed from the first surface,
  a central portion of the body wall, including a center of the body wall, is located at a position of the first thickness portion,
wherein
the cover includes a circumferential wall extending from an outer edge of the body wall toward the housing,
the insertion holes extend through the body wall and the circumferential wall,
the second thickness portion extends around a corresponding one of the insertion holes to be concentric to the insertion hole, and
opposite ends of the second thickness portion in a circumferential direction connect to the circumferential wall.

2. The motor-driven compressor according to claim 1, wherein
the housing includes a motor accommodation portion that accommodates the electric motor,
among the fasteners, at least one fastener fastens the cover to the motor accommodation portion,
the fasteners are inserted through the insertion holes.

3. The motor-driven compressor according to claim 1, further comprising a positioner that positions the housing and the cover, wherein
the positioner includes a fitting portion provided in the housing and a fitted portion provided in the circumferential wall and fitted to the fitting portion, and
the fitted portion is adjacent to the second thickness portion.

* * * * *